United States Patent
Klein et al.

(10) Patent No.: US 12,221,288 B2
(45) Date of Patent: Feb. 11, 2025

(54) MODULAR PLANT FOR PRODUCING FOOD PRODUCTS

(71) Applicant: BÜHLER GMBH, Reichshof (DE)

(72) Inventors: Achim Klein, Iserlohn (DE); Kay Hauschulz, Sankt Augustin (DE); Mark Knapp, York (GB)

(73) Assignee: Bühler GmbH, Reichshof (DE)

( * ) Notice: Subject to any disclaimer, the term of this patent is extended or adjusted under 35 U.S.C. 154(b) by 173 days.

(21) Appl. No.: 17/998,427

(22) PCT Filed: Apr. 26, 2021

(86) PCT No.: PCT/EP2021/060776
§ 371 (c)(1),
(2) Date: Nov. 10, 2022

(87) PCT Pub. No.: WO2021/228535
PCT Pub. Date: Nov. 18, 2021

(65) Prior Publication Data
US 2023/0183018 A1 Jun. 15, 2023

(30) Foreign Application Priority Data
May 11, 2020 (EP) .................................... 20173884

(51) Int. Cl.
*B65G 37/02* (2006.01)
*B65G 25/02* (2006.01)
*B65G 43/10* (2006.01)

(52) U.S. Cl.
CPC ............. *B65G 37/02* (2013.01); *B65G 25/02* (2013.01); *B65G 43/10* (2013.01); *B65G 2201/0202* (2013.01); *B65G 2207/30* (2013.01)

(58) Field of Classification Search
None
See application file for complete search history.

(56) References Cited

U.S. PATENT DOCUMENTS

| 2,377,155 A | * | 5/1945 | Jones | ..................... B65G 21/14 198/840 |
| 4,543,026 A | | 9/1985 | Halonen et al. | |

(Continued)

FOREIGN PATENT DOCUMENTS

| DE | 32 44 232 A1 | 6/1983 |
| DE | 37 40 109 A1 | 12/1988 |

(Continued)

OTHER PUBLICATIONS

European Office Action Corresponding to 21721083.0 mailed Sep. 6, 2023.

(Continued)

*Primary Examiner* — Kavel Singh
(74) *Attorney, Agent, or Firm* — Finch & Maloney PLLC

(57) ABSTRACT

A plant (100) for producing food products, more particularly chocolate products; a module for a plant of this kind and a method for process changeover on the plant (100). The plant (100) includes a plurality of modules (10) in which the food products, preferably in product carriers (20), can be processed and/or transported. The modules (10) each have a module frame (11) with heights (12), widths (13) and lengths (14, 15, 16). The length is a multiple of a smallest module length (15). The plant preferably has modules (10) with a single smallest module length (15) and modules (10) with a length (16) of a twice the smallest module length. Preferably, the modules (10) are designed such that they can be connected or are connected to adjacent modules in the longitudinal direction, preferably on both sides.

22 Claims, 11 Drawing Sheets

(56) References Cited

U.S. PATENT DOCUMENTS

| | | | |
|---|---|---|---|
| 4,597,709 A | 7/1986 | Yonezawa | |
| 4,944,357 A | 7/1990 | Wible et al. | |
| 5,180,602 A | 1/1993 | Bainbridge et al. | |
| 5,285,887 A | 2/1994 | Hall | |
| 5,664,929 A | 9/1997 | Esaki et al. | |
| 6,135,016 A | 10/2000 | Bindler | |
| 9,637,318 B2* | 5/2017 | Messina | B65G 41/005 |
| 9,637,319 B1* | 5/2017 | McCalib, Jr. | B65G 47/52 |
| 10,329,092 B2* | 6/2019 | Nothum, Jr. | B65G 41/005 |
| 10,815,074 B2* | 10/2020 | Yamaoka | B65B 43/52 |
| 10,899,546 B2* | 1/2021 | Munday | B65G 41/005 |
| 11,034,524 B2* | 6/2021 | Diehr | B65G 41/003 |
| 11,629,012 B2* | 4/2023 | Frangeul | B65G 21/00 198/618 |
| 2018/0213813 A1 | 8/2018 | Lenssen et al. | |
| 2018/0282074 A1 | 10/2018 | Nothum, Jr. et al. | |
| 2019/0106283 A1 | 4/2019 | Yamaoka et al. | |

FOREIGN PATENT DOCUMENTS

| | | |
|---|---|---|
| DE | 21 2006 000 033 U1 | 12/2007 |
| DE | 10 2007 017 646 A1 | 10/2008 |
| DE | 202 02 491 U1 | 6/2022 |
| EP | 0 685 396 A1 | 12/1995 |
| EP | 0 940 086 A1 | 9/1999 |
| EP | 3 111 768 A1 | 1/2017 |
| EP | 3 395 726 A1 | 10/2018 |
| FR | 2 779 133 A1 | 12/1999 |
| JP | S53-99782 U | 8/1978 |
| JP | S61-119513 U | 7/1986 |
| JP | 2009-298552 A | 12/2009 |
| WO | 03/070420 A1 | 8/2003 |
| WO | 2018/157904 A1 | 9/2018 |

OTHER PUBLICATIONS

International Search Report Corresponding to PCT/EP2021/060776 mailed Jul. 5, 2021.

Written Opinion Corresponding to PCT/EP2021/060776 mailed Jul. 5, 2021.

* cited by examiner

MODULAR PLANT FOR PRODUCING FOOD PRODUCTS

The invention relates to a plant for producing food products, in particular chocolate products, a module for such a plant and a method for converting the plant.

For the production of confectionery, in particular chocolate products, product carriers, in particular product molds, are typically moved between the processing stations by means of a chain or an endless belt, as shown for example in U.S. Pat. No. 5,180,602 A or DE 3740109 A1.

Plants for producing food products are often complete systems having various processing stations or sections. The known systems are often customized for special application purposes, for example for filled pralines or bars, in order to enable high throughput rates at high precision. The conversion from one food product to another food product is typically complex, in some instances even impossible.

Chain and belt conveyors are typically attached so as to be locationally fixed between processing stations that are likewise installed in a locationally fixed manner. This is favorable in the case of large systems in which the production sequence is fixedly predefined and which rarely have to be converted.

A system for producing of food products in which sections of the production line can be bridged by transfer installations, such as robots or pneumatic pick-and-place devices, in that the food products that are arranged in the product carriers are transferred between sections that are mechanically independent of one another, is known from EP0940086 A1. The processing stations are permanently installed, but not all of them must always be used.

Known from EP 3 111 768 A1 is a system for small batches in which industrial robots move the products between processing stations and, if necessary, already process them on the way. Since industrial robots are rather slow, their use is not very suitable for high throughput, i.e. for the industrial production of food products.

For manufacturers of high-quality food products, in particular chocolate products, who produce small or medium quantities of seasonal products and for market testing, or who want flexible industrial processing, adjustable systems with easy handling and high hygienic standards are required.

It is therefore the object to provide a plant for producing food products, in particular chocolate products, a module for such a plant and a method for converting the plant, which overcome the disadvantages of the known ones, which in particular allow high flexibility, quick convertibility and a user-friendly, automated production.

The object is achieved by the features of the independent claims. Advantageous refinements are set forth in the following description, the figures and in the dependent claims.

The plant for producing food products, in particular chocolate products, comprises a plurality of modules in which the food products can be processed and/or transported.

The food products are placed on or in product carriers, for example in hollow molds of product molds.

Preferably, at least part of the modules comprises in each case a processing unit.

The processing equipment can be a mold heater, a cooling station, a depositing station, a shell-forming station, a cold stamping station, an opening-forming station, a filling station, an insertion station, a shaking station, a capping station, a licking station, a decorating station, a demolding station, a stacking and/or unstacking station, a spraying station, a printer station, an insertion station, a packaging station, a film-placing station and/or a control station.

The modules each have a module frame with a height, a width and a length.

The length of the module is in each case a multiple of the smallest module length, thus the length of the shortest module in the plant. By multiple is meant one-fold or manifold.

The length of the module corresponds to the constructive length of the module frame and a tolerance length.

The tolerance length is preferably about one hundredth of the smallest module length, further preferably 7.5 mm on both sides, so that the module length is 15 mm longer than the design length of the module frame.

The tolerance length is used to compensate for variations in the production of the module frames, usually welded constructions.

The shortest module length occurring in the plant is also referred to as base length.

Preferably, the plant comprises modules with a single and twice a base length.

For example, a module of single base length can provide space for up to three product carriers, while a module of two-fold the smallest module length can provide space for up to seven product carriers.

The modules can therefore be arranged in one length direction on a grid, which makes it easier to change the arrangement and interchange modules.

When designing a plant, it is quickly apparent whether the desired processing stations fit into a given hall and how the processing stations can be arranged.

In particular, the module frames are substantially configured to be identical, so that in principle it does not matter which module follows which one. In case of a rearrangement of the plant, complex planning and installation work is eliminated.

The modules are preferably designed in such a manner that they can be connected or are connected to adjacent modules in the longitudinal direction, preferably on both sides.

Connectable means that adjacent modules can be brought into direct contact and/or can be brought into functional contact so that product carriers can be transferred from one module directly to the other module.

Preferably, a module frame is essentially directly adjacent to the neighboring module frame. In the ideal case, the neighboring module frames have a distance equal to the tolerance length.

The modules are preferably arranged lengthwise one after the other, so that at least part of the modules forms a row along which the product carriers are transported.

Preferably, another part of the modules form a second row, so that product carriers are transported along the first row to the end of the row and can be transported back again via the other row of modules.

In an advantageous embodiment of the plant, the plant has rails with a rail profile that can be fixed to the floor. The rails preferably have a convex rail profile in a cross-section perpendicular to the direction of extent. Rails with a convex profile meet the particular hygienic requirements that exist in the production of food products. A convex profile is easy to clean and has no pockets in which foodstuff residue or other dirt could accumulate.

Accordingly, the modules have wheels with a wheel profile complementary to the rail profile, so that the wheels can roll on the rails. Preferably, each module has four or eight wheels.

The modules can be placed on the rails in such a manner that they can be moved in the direction of their longitudinal extent, that is, they can roll.

In particular, the plant comprises a pair of rails on which a row of modules can be arranged or two pairs of rails on which two rows of modules can be arranged.

The rails ensure that the modules are arranged at a defined base height. Therefore, no special height adjustment is necessary when assembling or rearranging the module.

In another advantageous embodiment of the plant, the plant has fixing pockets that can be fixed to a floor, for example in a workshop.

At least one module has at least one fixing element, in particular a bolt arrangement. Through the interaction of fixing element and fixing pocket, a stationary locking of the module is achievable or achieved.

The fixing pocket can be designed as a receptacle for a bolt, which is slidably arranged on a module, in particular on the module frame, and can be guided into the receptacle.

By locking, it can in particular be prevented that a module continues to roll on a rail as soon as the module has assumed its desired position.

All modules can be locked in place at the respective fixing pockets. However, it may also be sufficient if only some modules are locked. Since the modules are arranged in a row, locking individual modules will also prevent the remaining modules from moving.

The fixing pockets are preferably to be arranged or are arranged in a grid along at least one transport direction, for example along the rails. The grid dimension, thus the distance between the fixing pockets, is determined by the length of the shortest module. The fixing pockets thus specify preferred positions for the arrangement of the modules.

Since the grid dimension is determined by the module length, i.e. the length of the module frame plus the tolerance length, it is ensured that the manufacturing tolerances of the frames do not add up. This is particularly important if the plant is set up in a rectangular arrangement, i.e. there is an outward and return path that must be of equal length.

The fixing pockets can preferably be screwed or are screwed to the floor of a workshop. In particular, they are placed or can be placed directly next to a rail.

The plant can comprise a forklift with which the modules can be arranged in a selected sequence and, for example, can be placed on rails and removed from there. For this purpose, the module frames can comprise support devices on which the forklift arms are guided and supported.

In a preferred embodiment of the plant, at least one module, preferably a plurality of modules, more preferably all modules, have a transport device for transporting product carriers in a linear movement along a transport direction, preferably along the length of the module.

The transport devices preferably ensure a transport cycle that is uniform or can be adapted to one another. The plant preferentially conveys 5-15, in particular 10, product carriers per minute.

The transport device transports a product carrier, preferably a plurality of product carriers simultaneously, through the module. The transport devices are preferably arranged in the module frames in such a manner that the transport device of a module can pick up product carriers from a first adjacently arranged module and deliver them to a second adjacent module. In particular, at least part of the transport devices are arranged in such a manner that they form a transport line when the associated modules are arranged on rails and/or when the associated modules are arranged flush with one another so that in each case one of the surface areas spanned by length and height of the module frames lie in one plane.

For this purpose, the transport devices in each module can have the same distance from one of the surface areas spanned by length and height of the module frame and from one of the surface areas spanned by width and length of the module frame.

The transport device can be a chain, a pair of chains or a conveyor belt. The transport device can comprise transport rails.

Preferably, the transport device has a drive system that pulls or pushes the product carrier, in particular in the transport direction. The drive system can comprise drive parts that move together with the product carrier, at least in sections, such as chains with or without drivers, one or more belts with or without drivers, push bars with or without drivers, or push tables with or without drivers.

Preferably, the drive system comprises two push bars which have drivers and are arranged parallel to each other and an electric linear drive for moving the push bars in and counter to a transport direction, as well as at least one vertical drive for a vertical movement of the push bars.

The electric linear drive may be an electric motor.

The drive system moves the push bars in the transport direction and pulls or pushes the product carrier in the transport direction using the drivers.

Preferably, pairs of drivers are provided, one of which is attached to the one push bar and the other driver is attached to the opposite slide bar. One pair of drivers can engage in a product carrier and push or pull it in a straight line.

A plurality of drivers can be attached to each of the push bars, so that a plurality of product carriers can be pulled or pushed with the push bars arranged parallel to each other.

The drivers are at a distance from one another that corresponds to the length of the product carriers. The length of the product carrier is considered to be the dimension in the direction of transport. The latter can be shorter than the width of the product carrier.

Preferably, each push bar has three drivers in small modules, thus modules with the smallest module length, and seven drivers in large modules, thus modules with twice the smallest module length.

On the side facing the transport device, usually on the lower side, thus the side facing away from the product, the product carriers can have a stop surface facing counter to the transport direction against which the carriers rest during transport.

Preferably, the product carriers are formed symmetrically and have two stop surfaces, so that it does not matter in which direction the product carriers are placed onto the plant and transported.

After the maximum movement of the push bars in transport direction, the push bars are lowered by the vertical drive.

The vertical drive can be provided as a pneumatic drive, which moves either the entire drive system with a pneumatic cylinder or moves each push bar with its own pneumatic cylinder.

The push bars are then moved by the drive system counter to the transport direction without taking along the product carriers.

The vertical drive then moves the push bars upwards again, whereupon the linear drive again provides for a forward movement of the product carriers.

The length of the linear movement is preferably greater than the length of a product carrier in transport direction and less than two lengths of a product carrier.

After the backward movement of the push bars, the drivers lie below the following product carrier. In particular, the foremost driver in the transport direction is situated below the product carrier which follows the product carrier previously transported by the driver. Since the linear movement is greater than the length of the product carrier in the transport direction, the product carrier is not transported any further when the forward drive starts; instead, the driver must first be moved back to the stop surface of the product carrier before the transport of the product carrier begins.

The last driver can grip the first product carrier leaving the following module. Since the linear movement is greater than the length of the product carrier in the transport direction, the product carrier does not have to be positioned exactly in relation to the product carriers already situated on the module. If the product carrier is at a greater distance, it can be moved to the group of product carriers in the first phase of the linear movement, in which the other product carriers are not yet transported.

This is particularly advantageous if the product carriers in a module have to be conveyed more slowly, for example in a module with a lick roller. At the transition to the next module, the product carriers have to be accelerated in order to regain the desired speed in the plant.

Preferably, the drive system is arranged on the module frame in such a manner that at least drive parts of the drive system, in particular the push bars, can be moved out of the module frame in or counter to the transport direction at least to one side in order to pick up a product carrier from an adjacent module or to deliver it to an adjacent module.

The product carriers can also be stably coupled to the drive parts of the drive system during the transition from one module to the next.

The product carriers for example lie stable on the push bars even during the transition from one module to the next module.

For mounting or removing a module, the drive system lies completely within the module frame, so that removal from a plant or installation of a module in a plant can be carried out without any problems.

The drive system comprises drive parts which project beyond the module frame during operation in and against the direction of transport and which are movable relative to the module frame in such a way that they can be displaced into an area within the module frame for removal or installation of the module. The drive system can have drive parts that are not only movable for transporting the product carriers, but can also be displaced, folded, pivoted as a whole.

A chain or belt section projecting above the module frame during operation can be folded down, for example, for assembly purposes.

It is also possible for the plant to comprise further modules in which the drive system does not extend beyond the module frame even during operation in and/or against the transport direction.

The modules can have sliding surfaces on which the product carriers can be placed and on which the product carriers can be displaced. In particular, two to eight slide rails arranged parallel to each other are provided as sliding surfaces.

Modules in which pressure is applied to the product carriers can have more than two slide rails. On the side facing the drive system, typically the lower side, the product carriers can have recesses which enclose the slide rails. The recesses can be located in walls at the front end, which also form the stop surfaces for transport.

In plan view, the slide rails are arranged between the push bars.

The modules can be arranged in a row on a pair of rails. When a product carrier has reached the end of the row, it can either be removed from the plant or returned above or below the modules.

Preferably, the product carriers are guided in a circuit.

The plant can also have at least two pairs of rails. Furthermore, the plant preferably comprises at least one module, which is configured as a traversing module. The traversing module connects two pairs of rails. The area of a production hall can be optimally utilized by connecting two pairs of rails with traversing modules to form a circulating production line.

For example, the traversing module comprises two module frames of the length of the base length, which stand on a respective pair of rails and are connected to each other. The traversing module comprises a transport device for transporting the product carriers from the one module row on the first pair of rails to the other module row on the second pair of rails.

Preferably, the transport device of the traversing module also comprises a drive system which has two push bars with drivers, which push bars are arranged parallel to each other, and an electric linear drive for moving the push bars in one transport direction, as well as at least one vertical drive for vertical movement of the push bars.

However, the transport direction for the traversing module is not longitudinal but perpendicular to it.

The drivers are at a distance from each other which corresponds to the width of the product carriers so that the product carriers do not have to be turned.

The product carriers can first be guided along a first module row, then pass through the traversing module to arrive at the second module row, can be guided back via the second module row and, if necessary, get back via another traversing module to arrive at the first module row. The product carriers can thus move in a closed circuit.

In particular, the transport device which connects the two module frames can be swiveled, folded or moved away with respect to the traversing module. This allows an operator to step between the module rows during an interruption of production.

The modules each have at least one control unit which comprises interfaces for data transfer with control units of adjacent modules. The control units of the modules can thus be connected in a ring or series connection or are connected in a ring or series connection.

Modules with different processing units can be arranged in any order or interchanged without the need to reprogram a central control unit for this purpose. The modules can identify themselves to their neighbors which can forward this message so that each module has information about the state of the plant.

In particular, the modules can include safety sensors and emergency switches. The ring or series connection can be configured such that all modules react as soon as one module forwards safety-relevant data to the control units of the adjacent modules or receives data from them. Each module will switch off its motors and pneumatic drives, if necessary.

The modules are therefore organized according to a decentralized safety concept.

In an advantageous embodiment of the plant, the plant has a central system controller and the modules each have an individual control unit. The central system controller can be connected to the control units of the modules or is connected to them in a manner that enables data exchange.

The central system controller is in particular configured to register the presence of the modules and/or to check their presence and/or to automatically detect the module sequence.

As an alternative, the central system control can comprise an input unit with which the sequence of the modules can be entered.

Each module can report to a line controller via DHCP and send identification. The line controller can query the switches of the modules via SNMP to identify adjacent modules. The line controller can then index the modules according to their physical arrangement and send this information, including the IP addresses of the respective adjacent modules, back to all modules.

The recipe for the production of the food product can then be sent to the modules via the line controller.

The line Controller can display the production sequence in a virtual line and the modules can always report their respective current status.

The plant is therefore able to organize itself, which facilitates new installations and modifications.

Typically, the plant also comprises permanently installed elements in addition to the modules. They can be connected to modules on one or both sides. The typically permanently installed modules can include a cooling unit, a demolding station and a palletizing station.

In the cooling unit, the finished food product is cooled to a temperature below room temperature, for example. In doing so, chocolate can solidify, for example.

In the demolding station, the product is removed from the product carrier.

Cooling unit and demolding station are usually located at the end of a module row. Between the cooling unit and the demolding station or after the demolding station, a buffer can be arranged which can be used, for example, if the finished products cannot be picked up quickly enough by a packaging unit.

The empty product carriers can be transferred via a traversing module to a palletizing station which supplies empty product carriers to the modules in sync with the plant cycle. In the palletizing station, the empty product carriers can be checked, dirty product carriers can be sorted out and fresh product carriers can be inserted, if necessary. The palletizing station can include an industrial robot for transferring the product carriers.

The permanently installed elements can also have a transport system that can be connected to the transport system of the modules and/or a transport device with a drive system that has two push bars with drivers, which push bars are arranged parallel to each other, and an electric linear drive for moving the push bars in one transport direction, as well as at least one vertical drive for vertical movement of the push bars.

The permanently installed elements can each have a control unit which can be connected to the control units of the modules in a ring or series connection.

In an exemplary embodiment of the plant, the latter comprises at least one module which has a depositor as a processing device. The depositor, for example a casting machine, delivers a food mass to the product carrier.

The module comprises a 3D drive device for a three-dimensional movement of the product carrier, in particular a robot or a combination of a linear drive system and a lifting table.

The product carrier can then be moved below the dispensing nozzle during the dispensing of a liquid food product, for example. In this way, uniform filling of molds can be achieved or a pattern can be created.

In the module, the product carriers can be transferred from a linear transport system, in particular as described above, to the 3D drive device and again be delivered from the 3D drive device to a linear transport system.

Furthermore, the object is achieved by a module for a plant as described above.

The module has a module frame with a height, a width and a length.

The module has a transport device for transporting product carriers in a linear movement along the length of the module.

The module has at least one control unit which comprises interfaces for data transfer with control units of adjacent modules so that the control units can be connected in a ring or series connection.

Furthermore, the object is achieved by a module, in particular as described above, for a plant as described above.

The module comprises a drive system with two push bars with drivers, which push bars are arranged parallel to each other, and an electric drive for moving the push bars in one transport direction, as well as at least one vertical drive. The drive system is arranged on the module, in particular on a module frame, in such a manner that the push bars can be moved out of the module in the transport direction at least to one side in order to pick up a product carrier from an adjacent module or to deliver it to an adjacent module.

The module preferably has a length of 1530 mm, which corresponds to the shortest module length, a length of 3060 mm, which corresponds to twice the base length, or a length of 4590 mm, which corresponds to three times the base length.

Furthermore, the object is achieved by methods for converting a plant as described above.

At least one module, in particular as described above, is removed from the plant and/or at least one module, in particular as described above, is inserted into the plant.

The invention is explained in the following in exemplary embodiments based on drawings.

In the figures:

FIG. 1 shows a plant 100 for producing food products, in particular chocolate products, in plan view.

Figure 1:
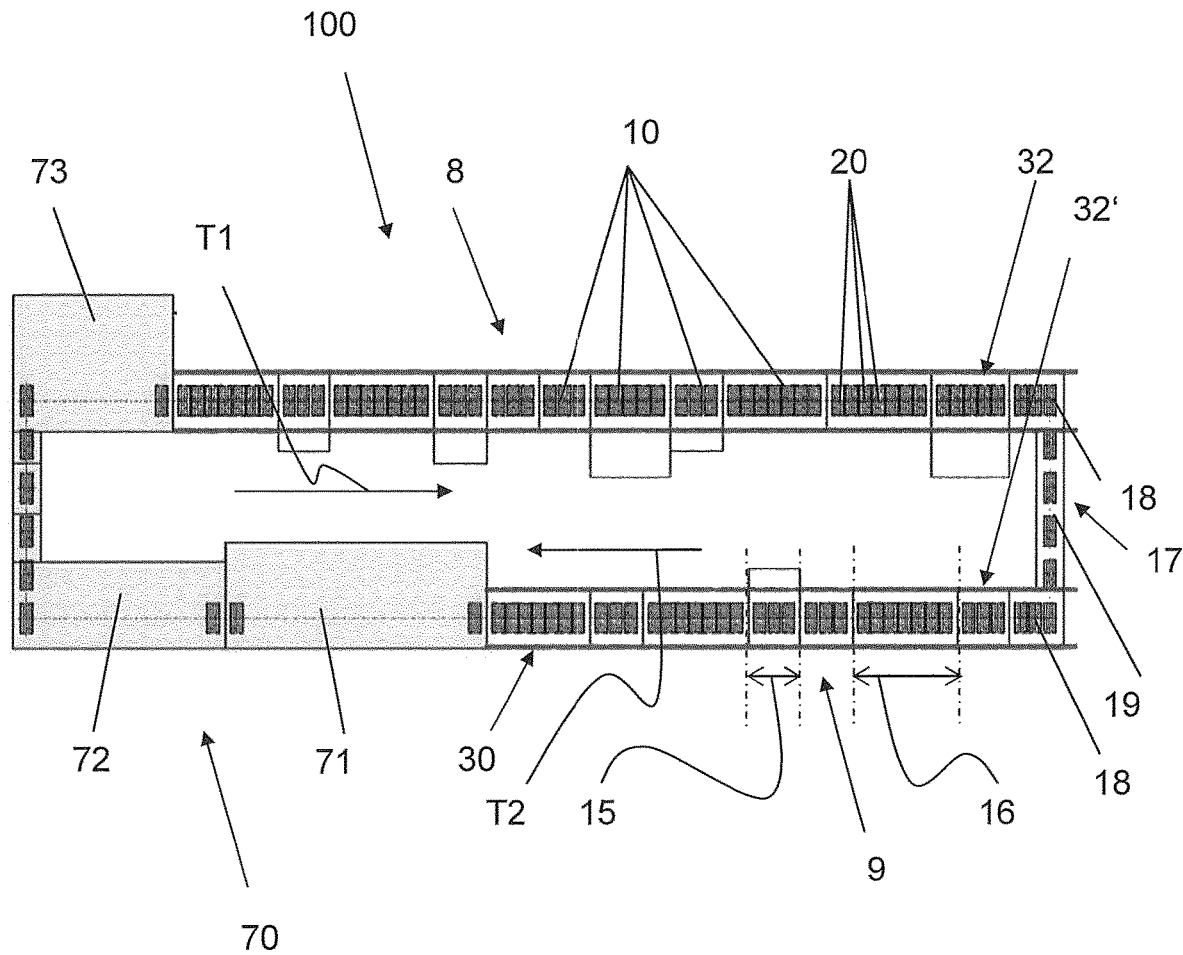
FIG. 1 shows a schematic illustration of a plant according to the invention in plan view.

The plant comprises modules 10, in which the food products, preferably in product carriers 20, can be processed and/or transported.

The plant 100 comprises modules 10 with a single smallest module length 15 and with a length 16 corresponding to twice a smallest module length 15.

The modules 10 with a single smallest module length 15 can accommodate three product carriers 20, the modules 10 with a length 16, that is, a two-fold base length, can accommodate seven product carriers 20.

The plant comprises rails 30 and the modules 10 are each arranged in a module row 8, 9 on a first pair of rails 32 and a second pair of rails 32'. The modules 10 can be connected to adjacent modules 10 on both sides in the longitudinal direction, which corresponds to the transport direction T1, T2, so that no intermediate elements or transition elements are required in the module rows 8, 9.

The module rows 8, 9 are connected by a traversing module 17. The traversing module 17 has one or more module frames 18, preferably two module frames 18, with a short module length 15, which stand on the opposite rail pairs 32, 32', and at least one traversing element 19 which connects the module frames 18 of the traversing module 17.

While the product carriers 10 in the module rows 8, 9 are transported along opposite transport directions T1, T2, the transport in the traversing module 19 is carried out perpendicular to the transport directions T1, T2.

The plant 100 comprises permanently installed elements 70, namely a cooling station 71, a demolding station 72 and a palletizing station 73.

Figure 2:
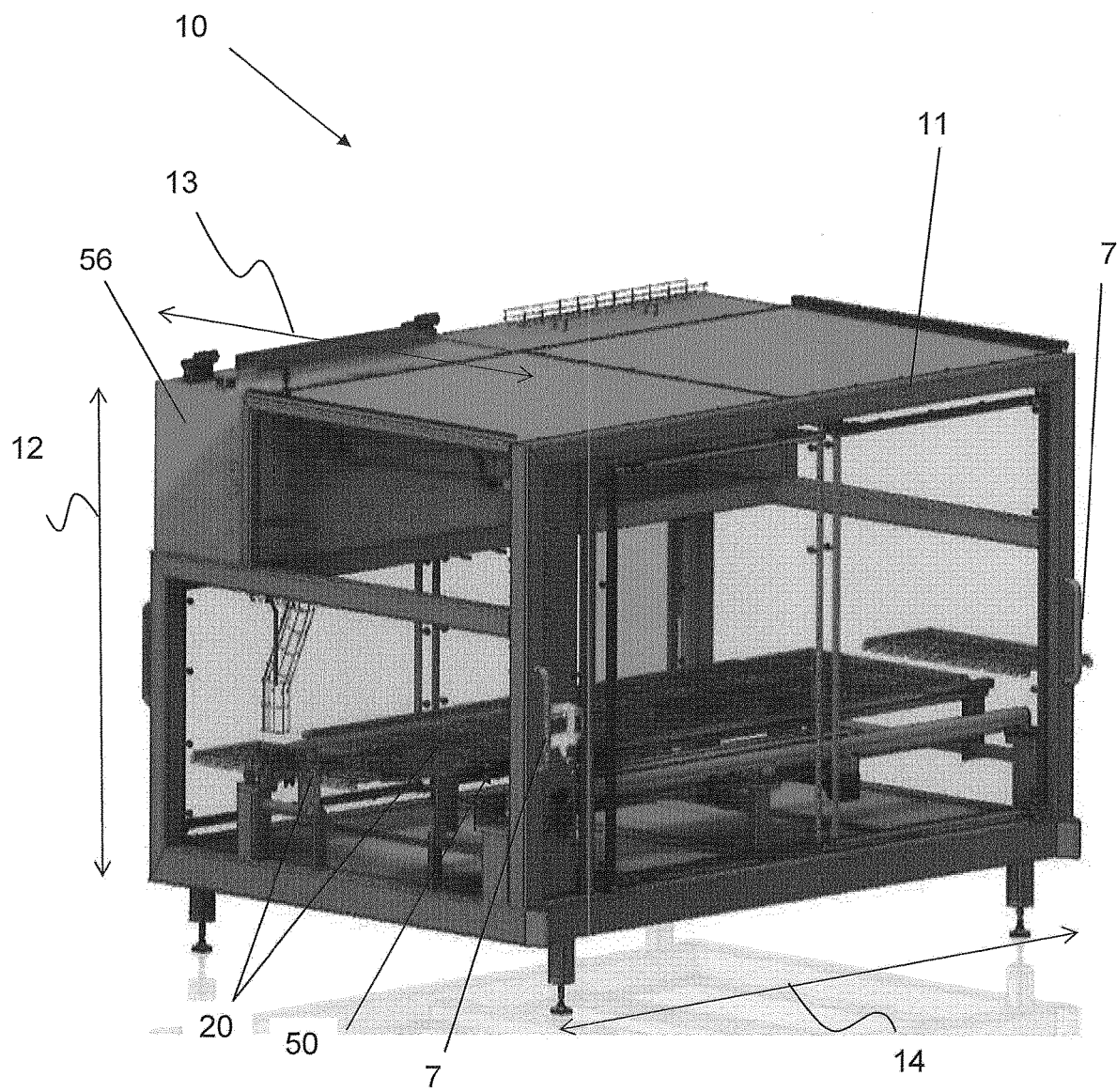
FIG. 2 shows an example of a module in perspective view.

FIG. 2 shows an example of a module 10 in perspective view.

The module 10 has a module frame 11 with a height 12, a width 13 and a length 14. All modules have a length 14 which corresponds to the one-fold or two-fold shortest module length 15 (see FIG. 1).

For example, the module here has a length of 3060 mm, which corresponds to twice the base length. It can accommodate seven product carriers 20, each with a length of 375 mm, a width of 900 mm and a height of 45 mm.

The module 10 has a transport device 50 for transporting the product carriers 20 and an individual control, which is arranged in a control unit 56.

Handles 7 are arranged on the module frame 11. If the module is equipped with wheels 33 (see FIG. 3), the module 10 can be moved easily.

Figure 3:
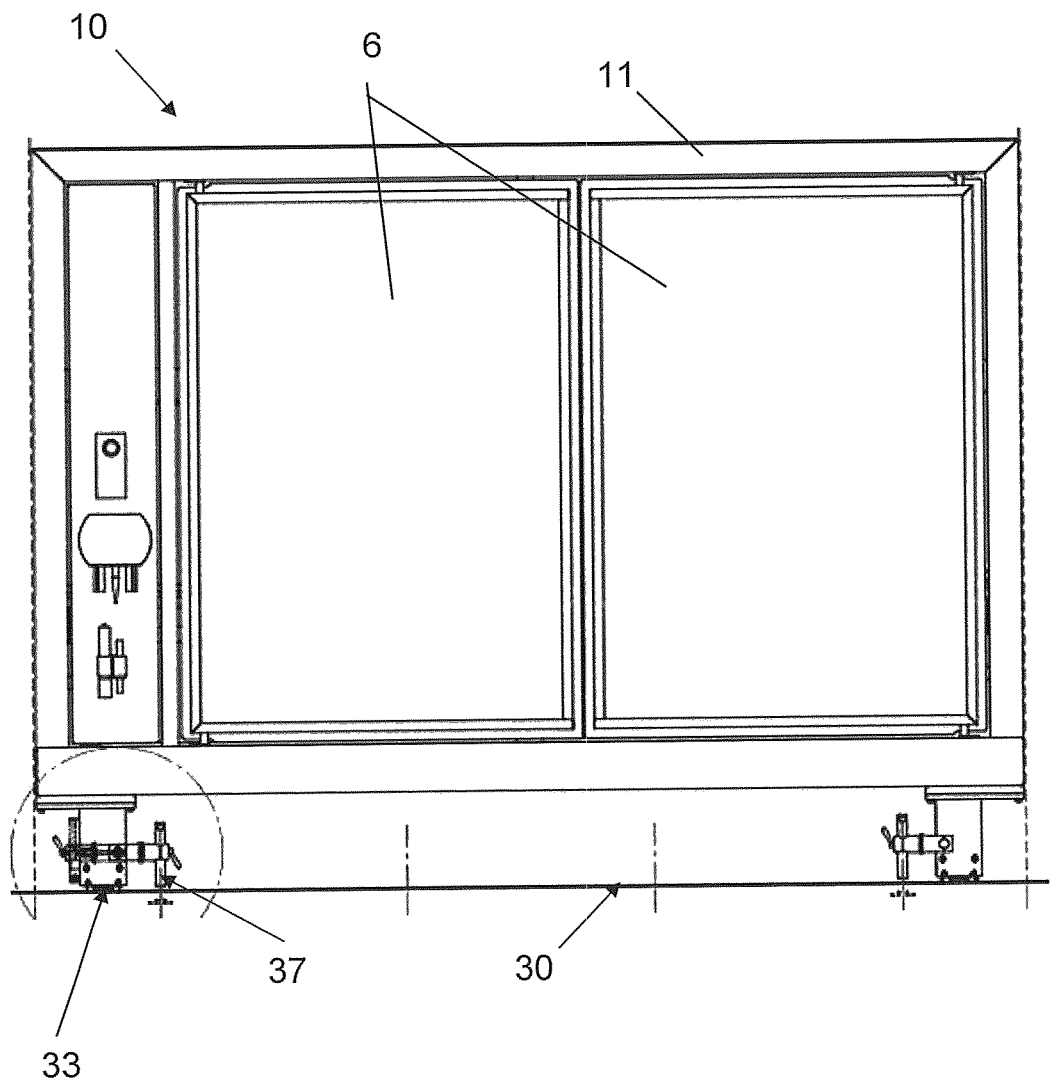
FIG. 3 shows a module in side view.

FIG. 3 shows a module 10 in side view. Wheels 33, which stand on rails 30, are mounted on the module frame 11. The module 10 also has a fixing element 37 that can be moved vertically for locking the module 10.

The module 10 has large doors 6 at the front side, through which the inside of the module 10 and the product carriers 20 are easily accessible.

Figure 4:
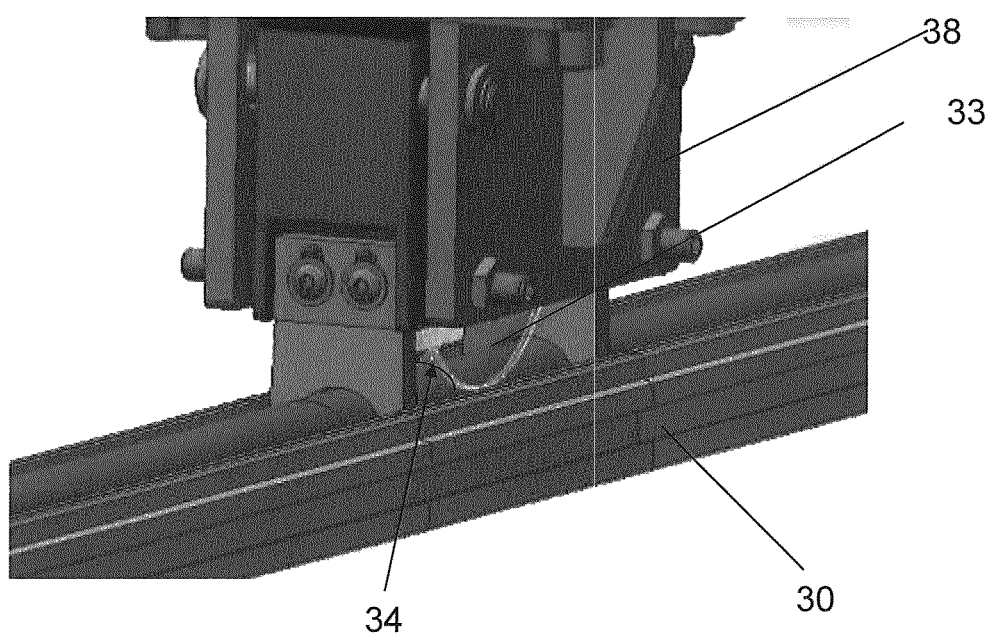
FIG. 4 shows a detailed view of a wheel on a rail in perspective view.

FIG. 4 shows a detailed view of a wheel 33 on a rail 30 in perspective view. The wheel 33 has a profile 34 which corresponds to the rail profile 31 (see FIG. 5).

For heavier modules 10 it is also possible to provide two wheels 33 arranged one behind the other in a wheel holder 38 (not shown in the figure), both wheels standing on the rail 30.

Figure 5:
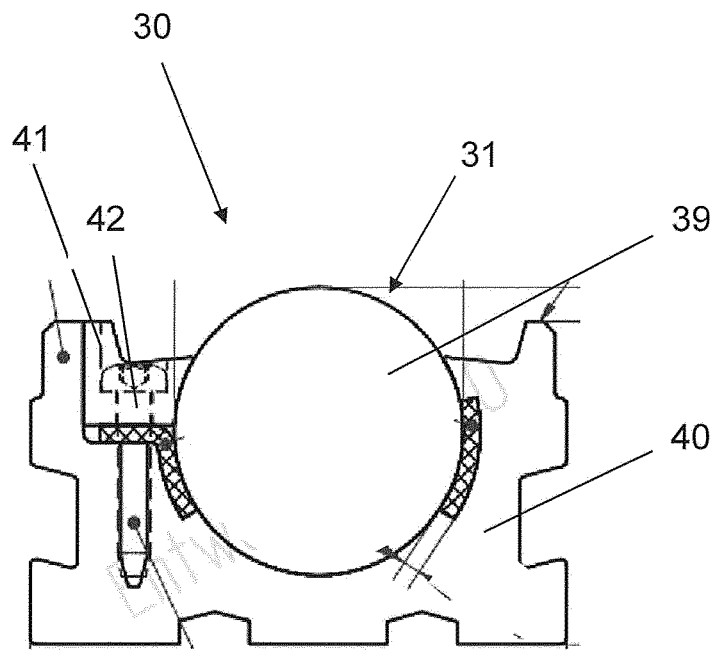
FIG. 5 shows a sectional view of a rail.

FIG. 5 shows a rail 30 in a sectional view of. The rail has a convex rail profile 31. A cylindrical guide rod 39 with a circular cross-sectional area is placed in a receiving rod 40 and fixed with a locking element 41, which is fastened with a screw 42.

Figure 6:
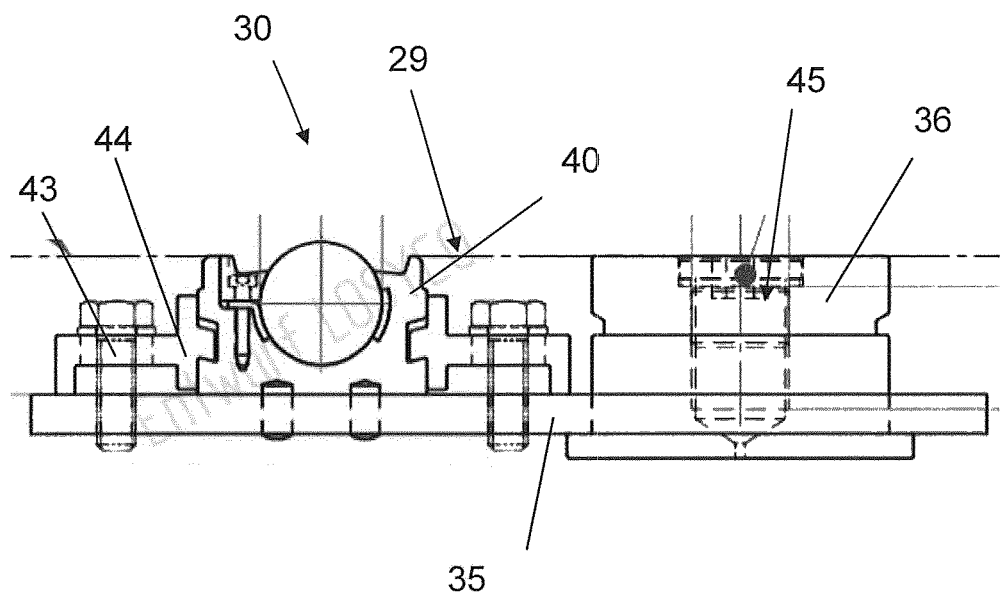
FIG. 6 shows a sectional view of a rail and a fixing pocket.

FIG. 6 shows a rail 30 and a fixing pocket 36 in a sectional view.

The receiving rod 40 of the rail 30 is fixed by means of brackets 44 fastened to the floor 35 with screws 43.

A fixing pocket 36 is embedded in the floor 35 directly next to the rail 30, which fixing pocket has a receptacle 45 for inserting a fixing element 37 (see FIG. 3).

The rails 30 and the fixing pockets 36 define a uniform base height 29 for the plant.

Figure 7:
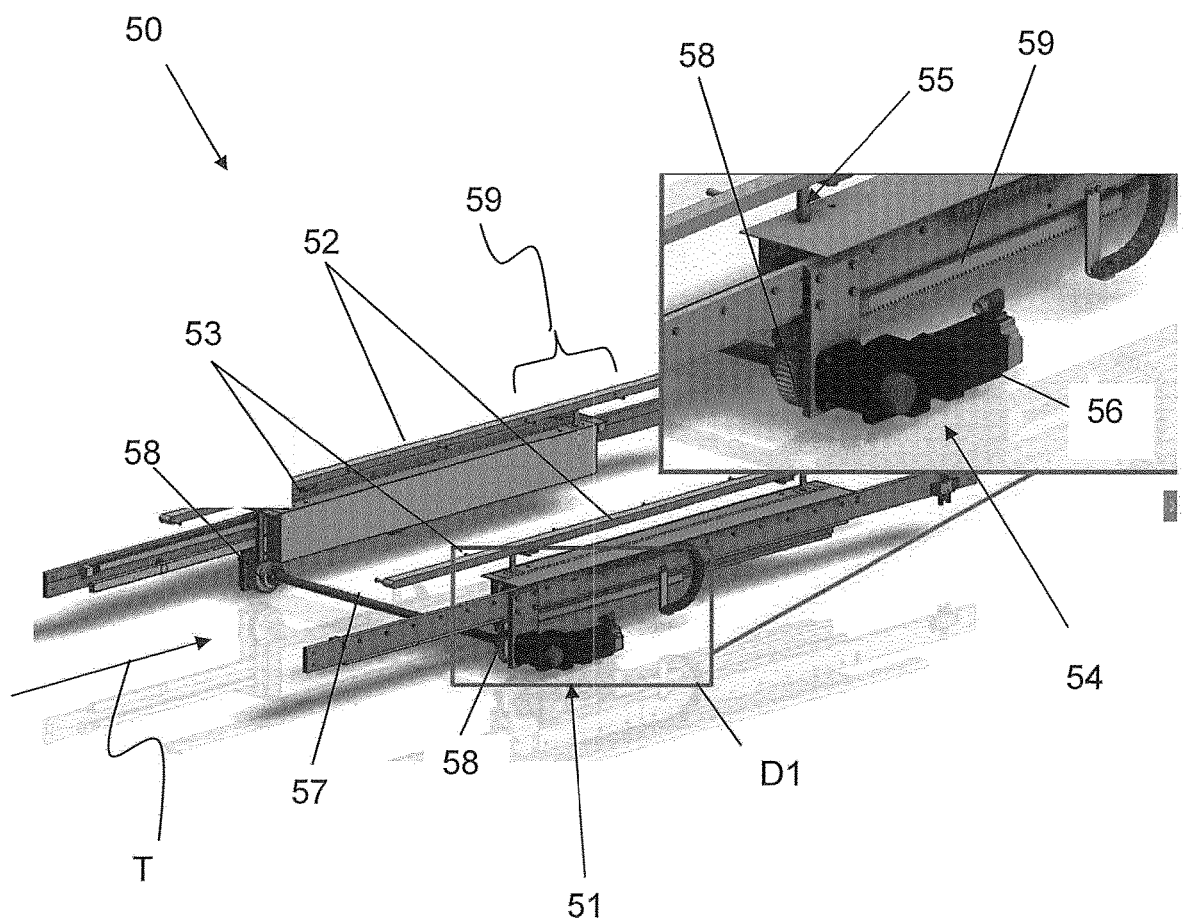
FIG. 7 shows a transport device in a first perspective view.

FIG. 7 shows a transport device 50 in a first perspective view with a detail D1 in an enlarged view.

The transport device 50 serves for transporting product carriers 20 (see FIG. 1) in a linear movement along a transport direction T, namely along the length 14 of module 10 (see FIG. 2).

The transport device 50 comprises a drive system 51.

The drive system can comprise drive parts such as chains with or without drivers, one or more belts with or without drivers, push bars 52 with or without drivers, or push tables with or without drivers. The drive system 51 has two push bars 52 arranged parallel to each other, to which drivers 53 are attached.

The drive system 5 comprises an electric linear drive 54 for moving the push bars 52 in and counter to the transport direction T.

An electric motor 56 drives two pinions 58 which are connected to a shaft 57 and which roll on a rack 59.

The push bars 52 can cover a distance in transport direction T which is greater than the distance 59 between two adjacent drivers 53 on a push bar 52.

The drive system 5 also comprises a vertical drive 55, in particular with one pneumatic cylinder per push bar 52, for vertical movement of the push bars 52.

Figure 8:
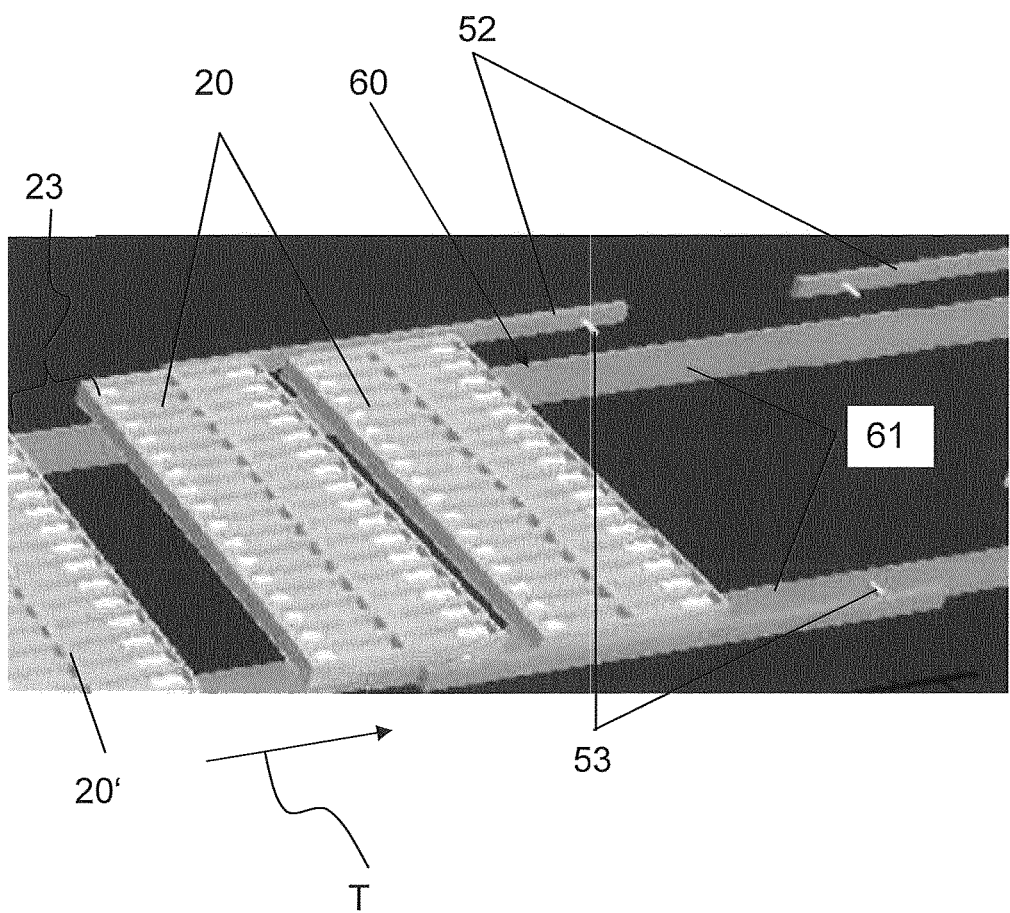
FIG. 8 shows the transport device m in a second perspective view.

FIG. 8 shows the transport system 50 in a second perspective view.

In each case two drivers 53 are arranged opposite each other for pushing/pulling a product carrier 20.

The push bars 52 are moved in a cycle with four steps. One step is a forward movement in transport direction T, wherein product carriers 20 are moved by the drivers in transport direction T. The transport direction 50 is shown here at the end of this step. For the sake of clarity, only two product carriers 20 are shown; the foremost product carrier 20 in transport direction T is omitted.

Thereafter, the push bars 52 are lowered and in a third step, the push bars 52 are moved backwards counter to the transport direction T.

Because the push bars 52 can cover a distance in transport direction T which is greater than the distance 59 between two adjacent drivers 53 on a push bar 52 (see FIG. 7), the distance 23 to the product carrier 20' is bridged by the following module. The front drivers 53 are now located approximately below the middle of the product carrier 20 and the rearmost driver is located near the stop surface of the product carrier 20' of the following module.

In a fourth step, the push bars 52 are lifted again. Then the cycle starts again with the first step. In doing so, the last product carrier 20' is pulled up to the other product carriers 20 and subsequently all three product carriers 20, 20' are moved together.

The product carriers lie on sliding surfaces 60, which are provided by two sliding rails 61.

The sliding surfaces 60 of all modules have a distance of, for example, 900 mm from the base height 29 defined by the rails 30 (see FIG. 6).

Figure 9:
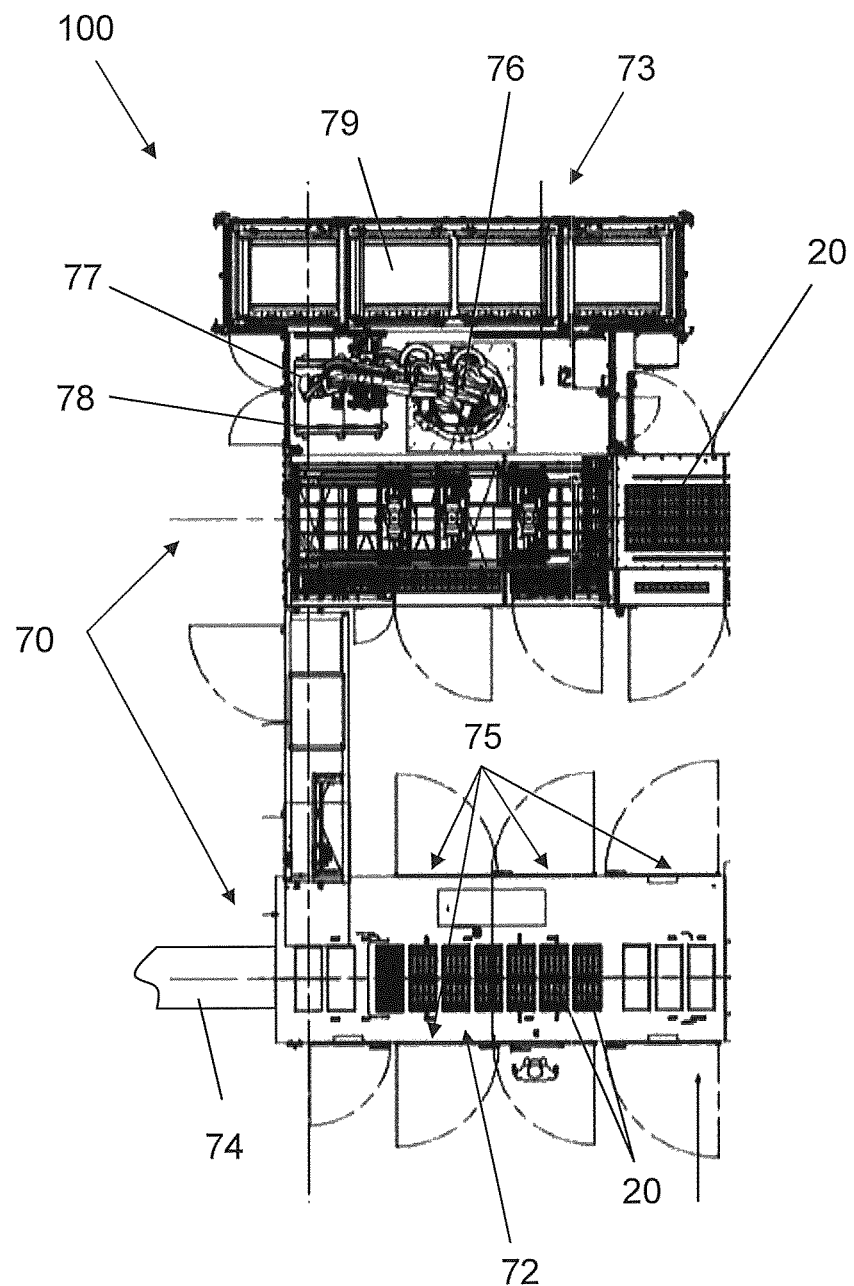
FIG. 9 shows part of a plant in plan view.

FIG. 9 shows part of a plant 100 in plan view. The plant 100 comprises, among other things, a demolding station 72 and a palletizing station 73 as permanently installed elements 70.

In the demoulding station 72, the products are loaded from the product carriers 20 onto a belt 74, which leads from the demoulding station 72 to a packaging station, which is not shown.

The demoulding station 72 has large doors 75 on both sides.

The empty product carriers 20 are fed to the palletizing station 73.

An industrial robot 76 removes dirty product carriers 77 and places them on a pallet 78 provided for this purpose, which can be moved out of the palletizing station 73 for cleaning.

Moreover, stacks 79 with fresh product carriers are stored in the 73 palletizing station. If necessary, the industrial robot 76 can remove 79 product carriers from these stacks.

Empty product carriers are loaded from the palletizing station 73 into a first module 20.

Figure 10:
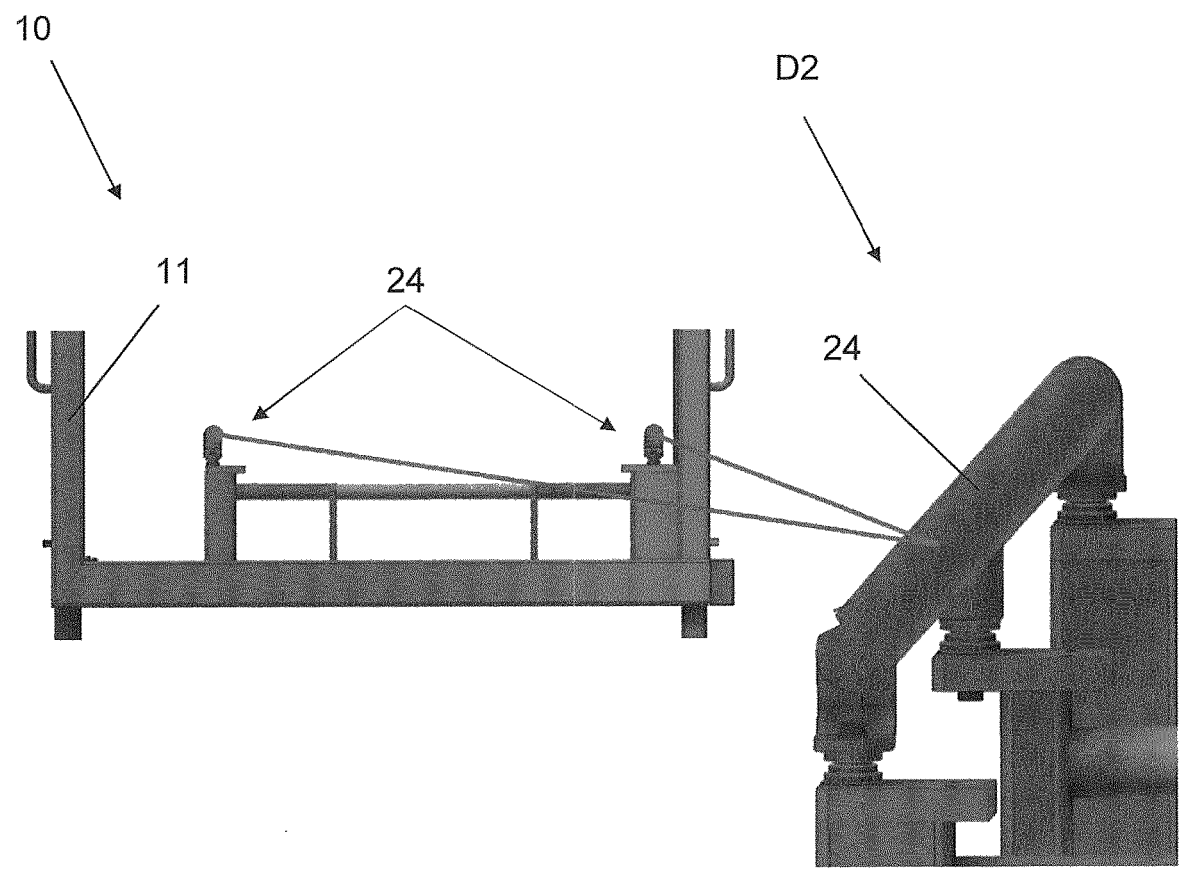
FIG. 10 shows part of a module in side view with a detail section in perspective view.

FIG. 10 shows part of a module 10 in side view with a detailed section D2 in perspective view.

Support rails 24 on which processing devices 21 (see FIG. 11) can be set down and fixedly mounted are attached inside the module frame 11.

Uniform module frames 11 can thus be used for different processing devices.

Figure 11:
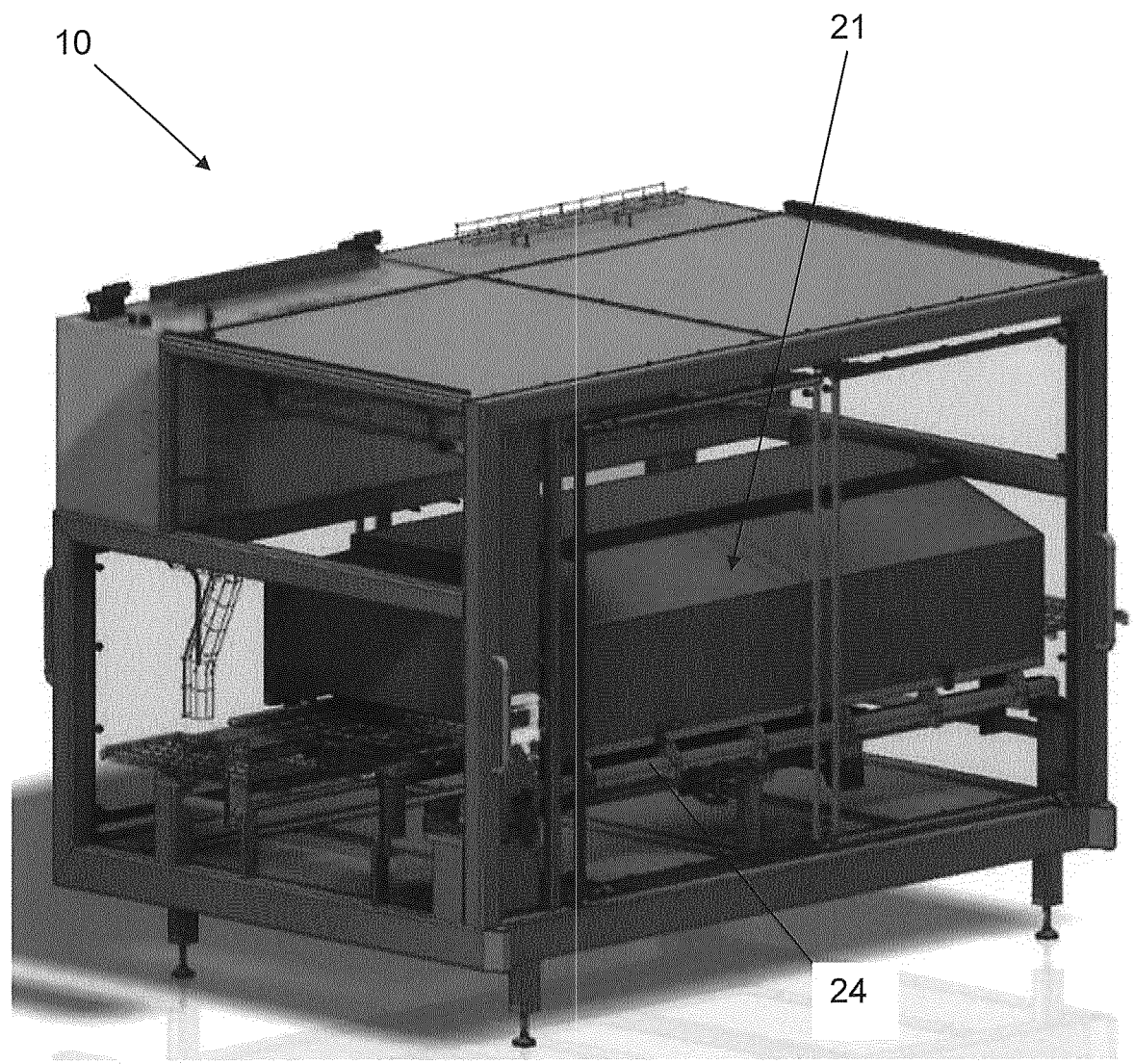
FIG. 11 shows a module with a first processing device in perspective view.

FIG. 11 shows a module 10 with a first processing device 21 in perspective view. In the example shown, an infrared heater 21 is mounted on support rails 24.

Figure 12:
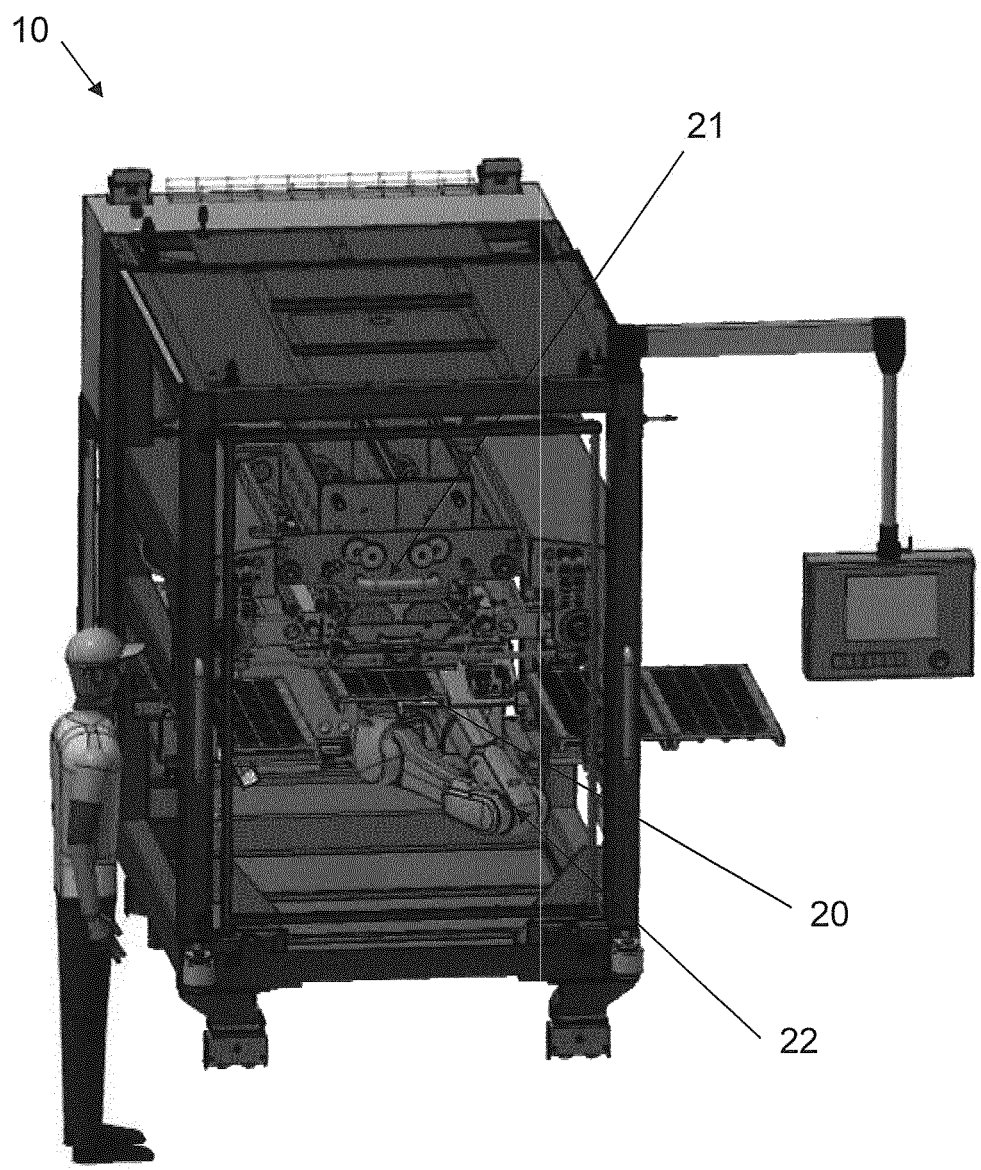
FIG. 12 shows a module with a second processing device in perspective view.

FIG. 12 shows a module with a second processing device 21 in perspective view.

In the example shown, a casting machine as the processing device 21 is arranged in module 10.

In addition, the module comprises a robot arm 3D as drive device 22 that moves the mold trays 20 below the casting machine 21.

The invention claimed is:

1. A plant for producing food products,
comprising a plurality of modules in which the food products in product carriers can be at least one of processed and/or transported,
wherein at least a part of the modules comprises in each case one processing device,
wherein
the modules each have a module frame with a height, a width and a length, wherein the length is a multiple of a smallest module length,
wherein at least one module has at least one transport device for transporting product carriers in a linear movement along a transport direction,
wherein the transport device comprises a drive system which is arranged on the module frame in such a way that at least drive parts of the drive system can be moved out of the module frame in the transport direction at least to one side in order to pick up a product carrier from an adjacent module or to deliver it to an adjacent module, and
wherein the drive system for mounting or removing a module lies completely within the module frame, the drive system has two push bars with drivers, which push bars are arranged parallel to each other, and an electric linear drive for moving the push bars in the transport direction, and at least one vertical drive for vertical movement of the push bars.

2. The plant according to claim 1, wherein the plant comprises modules with a single smallest module length and modules with the length of twice the smallest module length.

3. The plant according to claim 1, wherein the modules are designed in such a manner that they can be or are connected to adjacent modules in longitudinal direction.

4. The plant according to claim 1, wherein the plant comprises rails which have a rail profile, and which can be fixed to the floor, and the modules have wheels which have a wheel profile that is complementary to the rail profile.

5. The plant according to claim 4, wherein rail profile is a convex rail profile.

6. The plant according to claim 1, wherein the plant has fixing pockets which can be fixed to the floor and at least one module has at least one fixing element, and by the interaction of the fixing element and the fixing pocket, a stationary locking of the respective module can be achieved or is achieved.

7. The plant according to claim 6, wherein the fixing pockets are to be arranged or are arranged in a grid along at least one transport direction.

8. The plant according to claim 6, wherein fixing element is a bolt arrangement.

9. The plant according to claim 1, wherein the drive system is arranged on the module frame in such a manner that the push bars can be moved out of the module frame in the transport direction at least to one side in order to pick up a product carrier from an adjacent module or to deliver it to an adjacent module.

10. The plant according to claim 1, wherein the modules have sliding surfaces on which the product carriers can be placed and on which the product carriers can be displaced.

11. The plant according to claim 10, wherein the sliding surfaces are arranged parallel to one another on two to eight sliding rails.

12. The plant according to claim 1, wherein the plant comprises at least two pairs of rails and at least one module which is designed as a traversing module and connects the two pairs of rails, which comprises in particular a transport device which can be swiveled, folded or moved away with respect to the traversing module.

13. The plant according to claim 12, wherein the plant comprises a transport device which can be swiveled, folded or moved away with respect to the traversing module.

14. The plant according to claim 1, wherein the modules each have at least one control unit which comprise interfaces for data transfer with control units of adjacent modules, so that the control units of the modules can be connected or are connected in a ring or series connection.

15. The plant according to claim 1, wherein the plant has a central system controller which can be connected or is connected to control units of the modules.

16. The plant according to claim 15, wherein the central system controller automatically detects the module sequence.

17. The plant according to claim 1, wherein the plant comprises permanently installed elements which can be connected in particular to modules.

18. The plant according to claim 1, wherein the plant comprises at least one module which comprises a depositor as a processing device, and the module comprises a 3D drive device for a three-dimensional movement of the product carrier.

19. The plant according to claim 9, wherein the 3D drive device is a robot or a combination of a drive system and a lifting table.

20. A module for a plant according to claim 1, wherein the module has a module frame with a height, a width and a length, and has a transport device for transporting product carriers in a linear movement along the length of the module, and has at least one control unit which comprises interfaces for data transfer with control units of adjacent modules so that the control units can be connected in a ring or series connection, wherein the transport device comprises a drive system which is arranged on the module frame in such a way that at least drive parts of the drive system can be moved out of the module frame at least to one side in the transport direction in order to pick up a product carrier from an adjacent module or to deliver it to an adjacent module, and wherein the drive system for mounting or removing a module lies completely within the module frame.

21. The module according to claim 20, wherein the module comprises a drive system which has two push bars with drivers, which push bars are arranged parallel to each other, and the a drive system comprises an electric linear drive for moving the push bars in a transport direction, and the a drive system comprises at least one vertical drive for a vertical movement of the push bars, wherein the drive system is arranged on the module, in such a manner that the push bars can be moved out of the module in the transport direction at least to one side in order to pick up a product carrier from an adjacent module or to deliver it to an adjacent module.

22. A method for converting a plant according to claim 1, wherein at least one module is removed from the plant and/or at least one module is inserted into the plant, wherein the module inserted into the plant has a module frame with a height, a width and a length, and has a transport device for transporting product carriers in a linear movement along the length of the module, and has at least one control unit which comprises interfaces for data transfer with control units of adjacent modules so that the control units can be connected in a ring or series connection, wherein the transport device comprises a drive system which is arranged on the module frame in such a way that at least drive parts of the drive system can be moved out of the module frame at least to one side in the transport direction in order to pick up a product carrier from an adjacent module or to deliver it to an adjacent module, and wherein the drive system for mounting or removing a module lies completely within the module frame.

* * * * *